(12) United States Patent
Turner et al.

(10) Patent No.: US 6,862,576 B1
(45) Date of Patent: Mar. 1, 2005

(54) SECURE LOCKER SYSTEM AND METHOD

(75) Inventors: Edwin Turner, Marlow (GB); Adrian Paul West, Launton (GB)

(73) Assignee: Fujitsu Services Limited, London (GB)

( * ) Notice: Subject to any disclaimer, the term of this patent is extended or adjusted under 35 U.S.C. 154(b) by 718 days.

(21) Appl. No.: 09/609,505

(22) Filed: Jul. 3, 2000

(30) Foreign Application Priority Data

Jul. 10, 1999 (GB) .............................................. 9916228

(51) Int. Cl.$^7$ .......................... G06F 17/60; G08B 13/14
(52) U.S. Cl. ......................... 705/26; 345/963; 345/961; 340/569
(58) Field of Search ........................... 705/26; 340/569; 345/963, 961; 232/17; 235/381, 382

(56) References Cited

U.S. PATENT DOCUMENTS

| 4,894,717 A | | 1/1990 | Komei ......................... 358/108 |
| 6,085,170 A | * | 7/2000 | Tsukuda ....................... 705/26 |

FOREIGN PATENT DOCUMENTS

| EP | 0 396 139 | 11/1990 |
| EP | 0 531 942 | 3/1993 |
| GB | 2 302 976 | 2/1997 |

OTHER PUBLICATIONS

"Locker service for online home deliveries" (Ann, Tan Hwee. Oct. 6, 1999. The Straits Times).*

* cited by examiner

*Primary Examiner*—Jeffrey A. Smith
*Assistant Examiner*—Sabrina Chang
(74) *Attorney, Agent, or Firm*—Barnes & Thornburg LLP

(57) ABSTRACT

A locker system which permits secure delivery, or collection, of goods at a location and that can be associated with a single household or disposed centrally with respect to a plurality of households. A set of lockers, which may be of different sizes, capable of being in different states, e.g. ambient, chilled, frozen, and which are lockable separately, is disposed at the location. In-residence IT systems including computer means, such as servers, permit householders to place on-line orders with retailers/service providers, such as over the Internet. Prior to order placement, an appropriate locker for the size and state of the goods is reserved, such as by the household server contacting a management server via an Intranet. An access code required for unlocking the reserved locker is supplied to the household server, and forwarded to the retailer/service provider over the Internet together with the order and reserved locker location information. The retailer/service provider downloads the access code onto an electronic key, such as a smartcard, which the delivery person uses at delivery time in conjunction with a controller having an appropriate key reader. The controller with key reader identifies the reserved locker to the delivery person and unlocks it. The delivery person can then open the locker and insert the goods. Subsequent closure of the locker, relocks it and is used to indicate to the household server that the delivery has been made.

10 Claims, 2 Drawing Sheets

SECURE LOCKER SYSTEM AND METHOD

BACKGROUND OF THE INVENTION

This invention relates to a secure locker system, in particular an intelligent locker system, and especially to such a system for use with a "shopping from home" system, that is to say an inresidence IT (Information Technology) system.

Electronically assisted shopping is growing rapidly as consumers seek to maximise their free time and remove the drudgery from shopping, particularly for everyday items but also for hard to find speciality items. With the continual development of Internet based services both for selection and payment, an area restraining growth of these services is the delivery aspect. There is little point in saving time on the grocery shopping if you have to wait at home for the delivery person, even if a certain time window has been allocated for the delivery. One proposal in this respect has been to have the products delivered to a central point, sometimes at a predetermined time, for example workplace shopping, whereas another proposal is to provide a free-standing secure storage area, attached to the home (residence), in which goods can be left. Being only infrequently used, this latter storage proposal represents wasted space for much of the time and, in any event, represents a compromise since one unit cannot be used for dry, chilled, frozen products, and items such as dry cleaning, without subdivision into separate appropriate compartments, and probably representing even more wasted space.

SUMMARY OF THE INVENTION

According to the present invention there is provided a locker system, for use in connection with an in-residence information technology (IT) system and for the storage of goods associated with orders placed by a householder via the IT system, including a plurality of individually-lockable lockers, means for reserving a said locker for a said order, means for allocating an access code permitting unlocking of the said locker, said access code being forwarded to a retailer/service provider with the said order, means for interpreting said access code upon attendance of a delivery person at the plurality of lockers whereby to indicate the reserved locker and unlock it for use by said delivery person, and means to relock the reserved locker after use by said delivery person and to indicate to the householder's IT system that the delivery person has visited.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
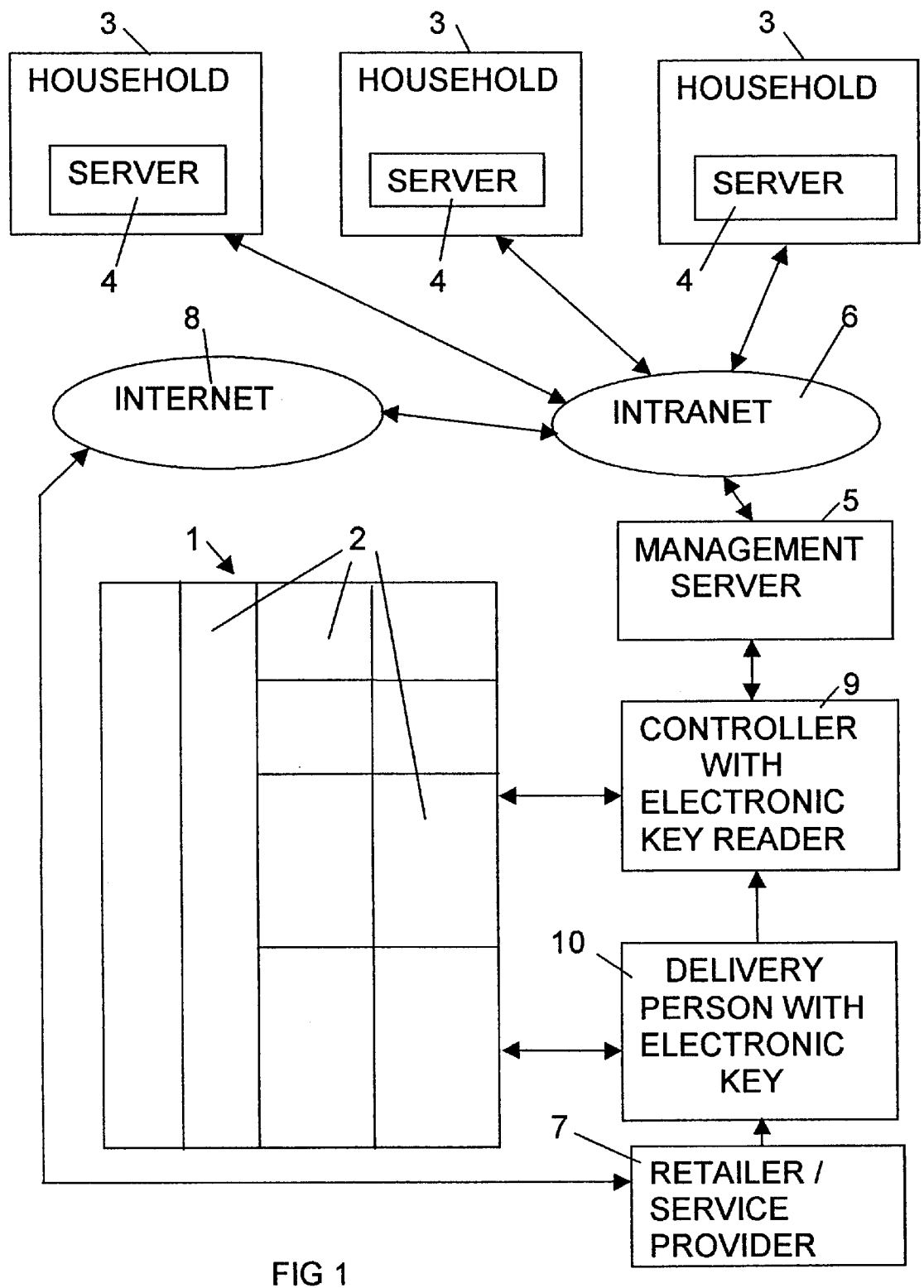
FIG. 1 illustrates a shared storage system for a number of households highly schematically.

In FIG. 1 there is illustrated a set 1 of storage lockers 2 which may be of different sizes and able to provide different environmental states. For example they may be chilled, frozen, ambient (plain), large, small, tall etc. The individual lockers are lockable separately.

The set of lockers is located at an appropriate location, which might be a single dwelling although the invention is most applicable to use with a community environment, such as a housing complex or apartment block, when the set of lockers is preferably placed at a central location, for example in the basement of an apartment block or at a centrally provided location in a housing complex. CCTV (closed circuit television) could be used to monitor such a location. The single dwelling arrangement is described hereinafter with reference to FIG.2.

In the arrangement of FIG. 1, each household 3 requiring to use the locker system has an in-residence IT system which includes computer means 4 comprising a respective server which is connected to a management server 5 for the locker system via a network 6 which may comprise an Intranet. The network 6 is connectable to a retailer/service provider 7 via an external network 8 which may comprise the Internet. The individual lockers 2 have respective locking devices on their doors which are controlled by a common means, for example a controller with an electronic key reader 9, such as a smartcard reader, with the lockers identified from the management server 5.

When a householder prepares to place an order with a retailer/service provider 7, such as over the Intranet/Internet connection illustrated, an appropriately sized locker or one with an appropriate size and environment, is reserved from the set 1 and, if not already locked, is locked. For example, a tall thin locker for dry cleaning, or a chilled one for groceries is reserved. This can be achieved simply by the householder viewing a list of the available lockers as provided by the management server and selecting an appropriate one, or alternatively the management server may select one appropriate to the intended contents. In any event, as a result of the selection the management server supplies an access code for the selected locker to the householder. The access code serves to allow the reserved locker to be unlocked. When the order is placed by the householder with the retailer/service provider, the locker location and the access code are also supplied. The retailer/service provider will subsequently download the access code to an electronic "key", for example a smartcard, which is given to the delivery person together with the goods to be delivered, if any, and any appropriate instructions, which might indicate clothes are to be collected for dry cleaning from a particular locker and subsequently returned to it.

At delivery (and/or collection) time, the delivery person 10 uses the electronic key, for example inserts the smartcard in a smartcard (electronic key) reader 9 and is advised which locker is involved. The locker is unlocked by the controller. The delivery person opens the locker's door, inserts (or removes) the goods, and closes the door which is then relocked. As the door is closed, a message is sent electronically to the server of the household concerned, i.e. the one that placed the order and reserved the locker. The message can include details to the effect that delivery (or collection) was made at a specified time and who the delivery person was, and is initiated by the controller 9.

The householder is provided with a similar electronic key for use in retrieving the delivered items at a later time.

In a pending GB Patent Application No. 9916170.5 (Household Management C1435), assigned to the same assignee as the present application, there is reference to use of such a locker system, an intelligent delivery locker system, in connection with a household management system. The latter involves electronic storage of data relating to the household on a computer means (server), including data relating to details of goods purchased from a retailer and/or services provided by a service provider. At least some of the data is supplied by the retailer/service provider in a form facilitating its input to the electronic storage. In the present case it is possible for the retailer/service provider to add the manifest for the current order onto the delivery person's electronic key and for the controller 9 to transmit the manifest to the appropriate household server 4, in order to update the household data inventory.

It should be noted that a particular delivery electronic key may hold, in separate partitions, information relating to a number of deliveries for the same location. Using the delivery time stamp, an operator providing the locker service to the householders can monitor the status of a locker, possibly using the time as a billing mechanism or noting when deliveries are not collected, in which case the household could be checked to see if the relevant consumer is incapacitated.

Another feature of the home management system referred to above is that the household's server can be accessed remotely. As a result the householder can check the status of a delivery, using a mobile phone or data terminal, and if delayed, can transfer the electronic key to remotely authorise a neighbour or a site manager to take the goods to the house or apartment.

Since the usage and type of delivery is known in advance, it is possible for the management server to control the energy into the individual lockers, only switching cooling on when a delivery is expected and thereby optimising energy consumption. A further possibility would be to assign chilled deliveries to adjacent lockers, thereby wasting less cooling energy.

The above system provides benefits to a number of parties. It provides the householder (consumer) with a mechanism enabling the secure delivery of products to a location close to their home, allowing them to shop remotely without worrying how and when the goods will be delivered. The site manager of a group of houses, apartment block or similar, is provided with a mechanism to allow controlled deliveries without unknown personnel moving unescorted throughout the premises. Such a locker system and delivery service would also make apartment blocks etc with it more attractive to householders than those without such a service. Retailers or other product-based service providers are provided with a delivery procedure which optimises the delivery process since one delivery person can make a number of deliveries to a single location (the set of lockers) rather than to a number of separate households/locations. It also allows them to provide a high level of consumer service, which will tend to engender customer loyalty.

Since the links between the consumers (householders) and lockers are all based on soft links (computer messages), the system is ideally suited to both long stay (residential) situations and those of a more transitory nature, such as short-lease apartment blocks, small office complexes or even hotels.

The system is most applicable to collections of residences or offices, but it can be scaled down to a single unit. The capital cost of the equipment is not large, and most importantly the installation is relatively simple, being the cost of the lockers, housing them and connecting them, using cable or radio, to each residence's IT system. If this is undertaken at building or refurbishment time, the additional cost will be minimal.

Figure 2:
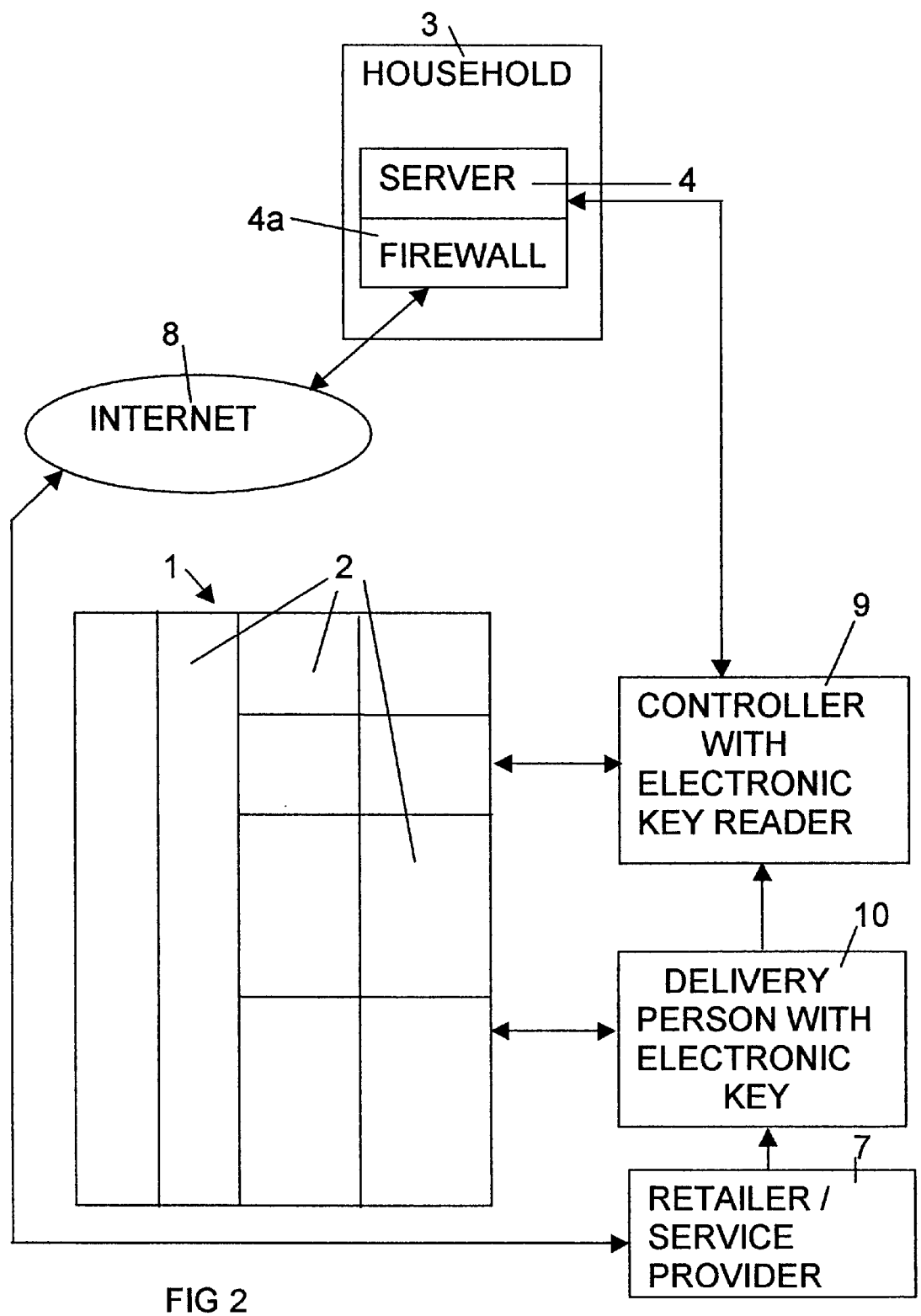
FIG. 2 illustrates a storage system for a single household.

In the case of use at a single household, the Intranet 6 and separate management server 5 of FIG. 1 are not required. As illustrated in FIG. 2, the household server 4 would instead be connectable directly to a network such as the Internet 8, possibly via a fire wall 4a, and connected directly to the controller with electronic key reader 9. The set 1 of lockers 2 can of course be significantly smaller in the case of a single household, i.e. less individual lockers.

When the householder prepares to place an order with the retailer/service provider 7, such as over the Internet connection 8, an appropriately sized locker or one with an appropriate size and environment is reserved. This can be achieved by viewing a list of the available lockers as provided by the server 4, and indicating an appropriate one. As a result, the server 4 will produce an access code for the selected locker. When the order is placed by the householder the access code is supplied, together with the location of the locker, which in this case will generally be the householder's address. The retailer/service provider will subsequently download this access code to an electronic key, to be used by the delivery person 10 to identify and unlock the appropriate locker via the controller with electronic key reader 9, as described above for the multiple household arrangement, and following opening of the locker to place the goods inside, a message confirming delivery can be sent to the server 4 when the locker is closed, when it will be locked. The server 4 can control the energy into the individual lockers, whereby to switch on cooling when a delivery is expected, for example. In this case the householder might have a duplicate electronic key as above, or might open the locker remotely from the in-residence IT system.

The invention thus augments a home shopping system by providing a secure delivery storage place linked to the in-residence IT system. The system provides a shared storage facility for multiple-home situations similar to left luggage locker facilities at rail stations, airports etc but with electronic reservation and delivery notification.

We claim:

1. A computerized home shopping system comprising:
   (a) a plurality of individually-lockable lockers for storage of goods,
   (b) a locker control system for controlling locking and unlocking of said lockers
   (c) an in-residence information technology (IT) system for enabling a householder to create an order for goods from a retailer/service provider,
   (d) means operable upon creation of the order, for reserving a particular locker from said plurality of lockers for the storage of said goods upon delivery, and for allocating an access code permitting unlocking of said locker, where said locker is of an appropriate size and environment for said goods,
   (e) means for forwarding said access code to a said retailer/service provider, together with said order, and
   (f) means for enabling a delivery person, when delivering said goods, to enter said access code to said locker control system,
   (g) said locker control system including means for interpreting said access code to indicate said locker and unlock it for use by said delivery person, and means to relock said locker after use by said delivery person and to indicate to the in-residence IT system that the delivery person has visited.

2. A locker system as claimed in claim 1, wherein the retailer/service provider downloads the access code onto an electronic key for use by the delivery person, and wherein the interpreting means comprises a controller with a reader for reading the access code from the electronic key.

3. A locker system as claimed in claim 2, wherein the electronic key is a smartcard.

4. A locker system as claimed in claim 1, and for use in connection with a plurality of households with in-residence IT systems, and including a management server comprising said reserving means, and wherein the plurality of IT systems are connectable to the management server via a first network.

5. A locker system as claimed in claim 4, wherein the in-residence IT systems are connectable with the retailer/service provider via a second network.

6. A locker system as claimed in claim 2, wherein the controller comprises said relocking means and serves also to initiate transmission of a signal to the respective in-residence IT system indicative of the delivery person's visit.

7. A locker system as claimed in claim 1, wherein the lockers are of a plurality of sizes and/or are able to provide a plurality of environmental states.

8. A locker system as claimed in claim 7, wherein the said order comprises the delivery of goods requiring a chilled or frozen locker, and wherein the reserving means serves also to supply energy for chilling or freezing the reserved locker from an appropriate time prior to the delivery person's visit.

9. A locker system as claimed in claim 1, and for use in connection with a single household, and wherein a server of the household IT system comprises said reserving means and said access code allocating means and is employed for the placing of orders with the retailer/service provider over a respective network.

10. A computerized home shopping method comprising:
 (a) providing a plurality of individually-lockable lockers for storage of goods, said lockers having a locker control system for controlling locking and unlocking of said lockers
 (b) creating an order for goods from a retailer/service provider using an in-residence information technology (IT) system,
 (c) upon creation of the order, reserving a particular locker from said plurality of lockers for the storage of said goods upon delivery, and allocating an access code permitting unlocking of said locker, where said locker is of an appropriate size and environment for said goods,
 (d) forwarding said access code to said retailer/service provider, together with said order,
 (e) enabling a delivery person, when delivering said goods, to enter said access code to said locker control system,
 (f) interpreting said access code to indicate said locker and unlock it for use by said delivery person, and
 (g) relocking said locker after use by said delivery person and indicating to the in-residence IT system that the delivery person has visited.

* * * * *